UNITED STATES PATENT OFFICE

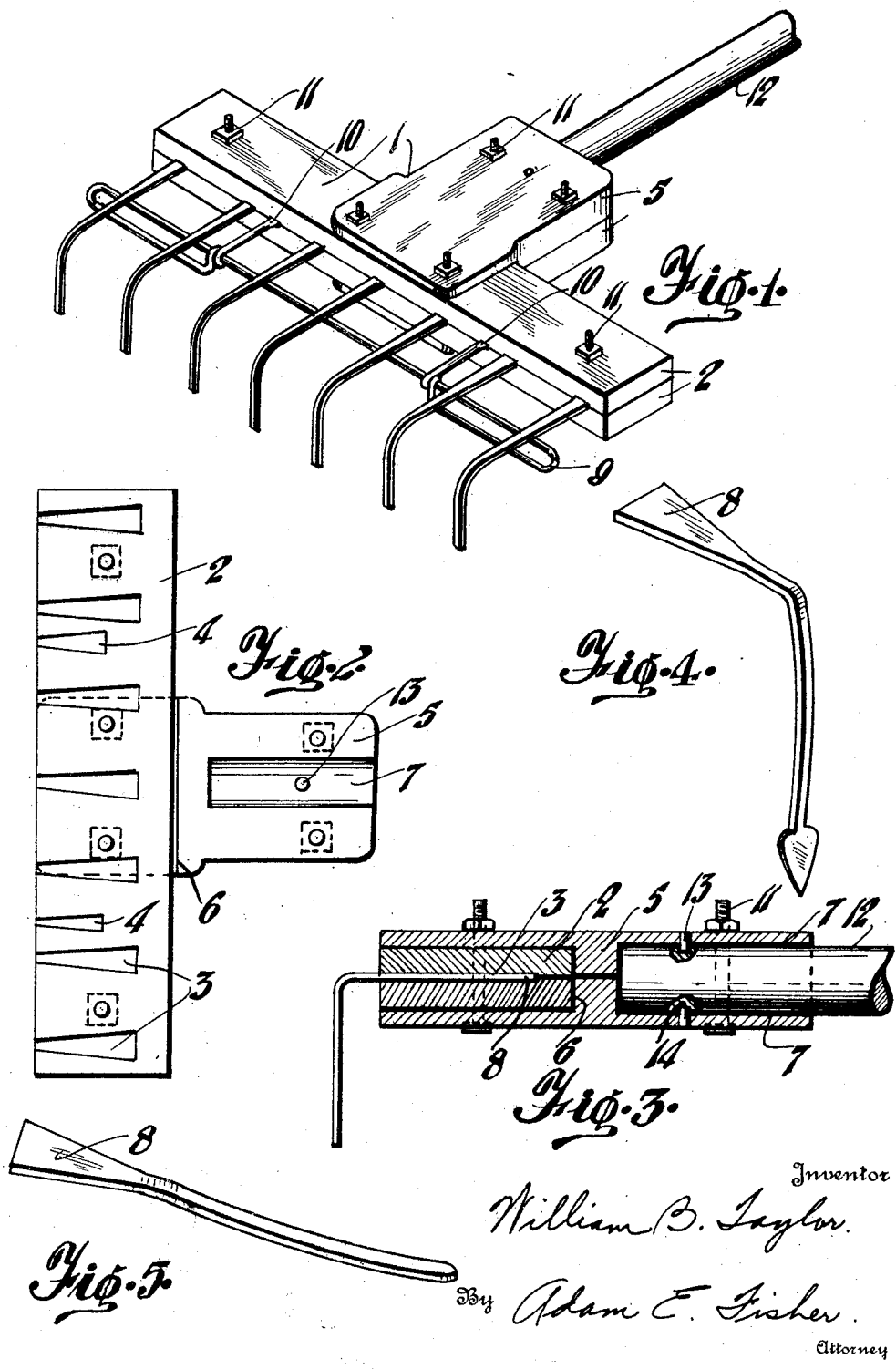

WILLIAM B. TAYLOR, OF WINTER PARK, FLORIDA

COMBINATION RAKE, FORK, AND CULTIVATOR

Application filed July 23, 1928. Serial No. 294,791.

This invention is a combination rake, fork and cultivator for general garden and lawn use.

The object is to provide a main, separable frame into which a variety of teeth may be inserted at will, to adapt the tool to any one of the uses stated.

In the drawing

Figure 1 is a perspective view of the tool in the form of a rake;

Figure 2 is a detail of a portion of the head-frame;

Figure 3 is a medial section through the head-frame, the insert end of the handle being shown in full, and there being shown extended from the head a special form of cultivator teeth;

Figure 4 is a detail of a form of cultivator tooth employed;

Figure 5 is a detail of a form of fork tooth employed.

The invention comprises a head-frame designated generally by the numeral 1. This head frame includes two elongated tooth engaging blocks 2, in each of which are formed a number of flat, triangular, registering, tooth engaging recesses 3, and two similar though smaller tooth supporting rod recesses 4, one near each end of each of the blocks 2 and in registering relation. Two handle blocks 5 are provided and are cut away at 6 co-equally with the thickness of one of the blocks 2, and each has a semi-cylindrical recess 7 adapted to register with each other to form a complete handle socket when the frame is assembled. A variety of forms of teeth are provided. In Figure 1, the device is shown equipped with rake teeth. In Figure 4 is shown a cultivator tooth and in Figure 5, a fork tooth. The shanks 8 of all these teeth are formed angularly so as to fit nicely within the tooth engaging recesses 3 of the blocks 2. Thus any set of teeth desired may be inserted in the blocks to adapt the tool for use as a rake, a cultivator or a fork. Where teeth with long shanks are used, as is the case with the rake teeth shown employed in Figure 1, the shanks may be supported by means of a tooth supporting rod 9 passed underneath the shanks and having angular end portions 10 which are inserted in the recesses 4. The frame elements 2 and 5 are fastened together with bolts 11. The handle 12 is held in its socket by lugs 13 extended from the wall of the socket into recesses 14 in the handle.

While I have herein described a certain specific manner and method of constructing and assembling the elements of my invention, it is understood that I may vary from the same in minor details, not departing from the spirit of my invention, so as best to construct a practical device for the purpose intended, and as defined in the appended claim.

I claim:

In a device of the kind described, a head frame comprising a pair of tooth engaging blocks having triangular tooth receiving recesses formed in each, teeth having triangular end portions seated in the said recesses, a pair of handle blocks cut away at one end co-equally with the tooth receiving blocks and adapted to straddle the same, the said handle blocks having registering semi-cylindrical recesses adapted to receive a handle and lugs in the said semi-cylindrical recesses to engage a handle seated in the recesses.

In testimony whereof I affix my signature.

WILLIAM B. TAYLOR.